US012576360B2

(12) United States Patent
Makaruk et al.

(10) Patent No.: US 12,576,360 B2
(45) Date of Patent: **\*Mar. 17, 2026**

(54) METHOD AND SYSTEM FOR CAPTURING CARBON DIOXIDE FROM THE AIR

(71) Applicants: Axiom Angewandte Prozesstechnik GES.M.B.H., Ebreichsdorf (AT); Aleksander Makaruk, Vienna (AT)

(72) Inventors: Aleksander Makaruk, Vienna (AT); Johannes Szivacz, Weigelsdorf (AT)

(73) Assignee: AXIOM ANGEWANDTE PROZESSTECHNIK GES.M.B.H., Ebreichsdorf (AT)

( \* ) Notice: Subject to any disclaimer, the term of this patent is extended or adjusted under 35 U.S.C. 154(b) by 387 days.

This patent is subject to a terminal disclaimer.

(21) Appl. No.: 18/018,452

(22) PCT Filed: Jul. 28, 2020

(86) PCT No.: PCT/EP2020/071255
§ 371 (c)(1),
(2) Date: Jan. 27, 2023

(87) PCT Pub. No.: WO2022/022808
PCT Pub. Date: Feb. 3, 2022

(65) Prior Publication Data
US 2023/0294043 A1 Sep. 21, 2023

(51) Int. Cl.
B01D 53/78 (2006.01)
B01D 53/62 (2006.01)
(Continued)

(52) U.S. Cl.
CPC ............. B01D 53/78 (2013.01); B01D 53/62 (2013.01); B01D 53/965 (2013.01);
(Continued)

(58) Field of Classification Search
CPC ...... B01D 53/78; B01D 53/62; B01D 53/965; B01D 61/423; B01D 61/445;
(Continued)

(56) References Cited

U.S. PATENT DOCUMENTS

2010/0059377 A1\* 3/2010 Littau ................... C02F 1/4693
204/627

\* cited by examiner

*Primary Examiner* — Thuan D Dang
(74) *Attorney, Agent, or Firm* — Panitch Schwarze Belisario & Nadel LLP

(57) ABSTRACT

A method for separating and recovering carbon dioxide from ambient air includes continuously bringing ambient air into contact with a basic aqueous solution; electrodialysis of the solution using bipolar and anion-selective ion exchange membranes as well as recycling the depleted solution; separating $CO_2$ from the enriched solution and recycling the solution depleted of $CO_2$. The absorption is performed in an absorber, open basin, or a combination thereof. Separation is achieved by thermal desorption of $CO_2$ by steam stripping to obtain a carbon dioxide/steam mixture; and/or by chemical reaction of the (hydrogen-) carbonate ions, in which the $CO_2$ contained is converted into a water-insoluble salt or a gas and simultaneously removed from the solution. The pH of either obtained solution is measured before the recycling or before the separation, and is adjusted to a predetermined value. pH is measured and adjusted based on how absorption and separation are performed.

28 Claims, 5 Drawing Sheets

(51) Int. Cl.

| | | |
|---|---|---|
| *B01D 53/96* | (2006.01) | |
| *B01D 61/42* | (2006.01) | |
| *B01D 61/44* | (2006.01) | |

(52) U.S. Cl.
CPC ......... *B01D 61/423* (2022.08); *B01D 61/445* (2013.01); *B01D 2257/504* (2013.01); *B01D 2258/06* (2013.01); *B01D 2311/2512* (2022.08); *B01D 2311/2626* (2013.01); *B01D 2325/42* (2013.01)

(58) Field of Classification Search
CPC .......... B01D 2257/504; B01D 2258/06; B01D 2311/2512; B01D 2311/2626; B01D 2325/42; B01D 2251/30; B01D 2251/304; B01D 2251/306; B01D 2251/40; Y02A 50/20; Y02C 20/40
See application file for complete search history.

METHOD AND SYSTEM FOR CAPTURING CARBON DIOXIDE FROM THE AIR

CROSS-REFERENCE TO RELATED APPLICATIONS

This application is a Section 371 of International Application No PCT/EP2020/071255, filed Jul. 28, 2020, which was published in the German language on Feb. 3, 2022, under International Publication No. WO 2022/022808 A1, the disclosure of which is incorporated herein by reference.

The present invention relates to a method and a facility for separating and recovering carbon dioxide from air.

STATE OF THE ART

Because of the low $CO_2$ content of air and the high energy use of chemical separation methods, filtering the global warming gas $CO_2$ from the atmosphere has been regarded as inefficient and hardly implementable in an industrial scale. Nevertheless, corresponding methods are and have been developed because the $CO_2$ recovered thereby does not necessarily have to be stored, but could be used, for example, in the beverage industry, in greenhouses or for chemical syntheses, e.g., for producing methane by reaction with hydrogen, which can sometimes be obtained in a sustainable manner by water electrolysis using solar and/or wind electrical energy, or for producing synthetic fuels. For the latter purpose, however, there are to be high requirements regarding the purity of the separated $CO_2$, and it requires continuous large amounts of pure gas, which results in an enormous increase of production costs.

A modern method for separating carbon dioxide, which is implemented by the Swiss company Climeworks, e.g., in Switzerland and in Iceland, consists of blowing ambient air over filters using a multitude of giant fans, its surface being impregnated with amines adsorbing the acidic $CO_2$. Subsequent desorption is performed by heating the "loaded" filters, which requires enormous quantities of thermal energy. While waste heat of power plants or incinerators can (at least largely) be used therefor, the energy requirements of the method per se remain high. In particular because during desorption via simply heating the filter—which is done in the presence of air—a product gas is obtained, which also contains relatively large amounts of $N_2$ (typically at least 5% by volume) in addition to $CO_2$, the separation of which is extremely complicated. But also because the absorbent impregnated with amines is relatively instable and has to be replaced from time to time.

US 2010/059377 A1 discloses a method for removing $CO_2$ from exhaust gases of factories, in particular from plants generating electrical power by burning fossil fuels and from coal gasification plants. This includes the absorption of $CO_2$ and of further components of the exhaust gas into a 10 to 50% aqueous $K_2CO_3/KHCO_3$ solution in a spray tower, followed by an ion exchange for removing multivalent cations, whereafter the solution is pressurized to 2 to 200 atm, preferably to >30 atm. During subsequent electrodialysis using a bipolar dialysis membrane, part of the hydrogencarbonate ions is removed. During dialysis—which hereinafter means electrodialysis—these move to a process stream buffered at a constant pH value of 3 to 4, which is the reason for the previous pressurization, in order to inhibit the escape of $CO_2$ during dialysis. Then, this process stream enriched with $CO_2$ is simply ventilated, i.e., the pressure thereof is released, so that the $CO_2$ escapes from the strongly acidic solution.

A primary disadvantage of this method is the strongly acidic pH value of the process stream enriched with $CO_2$, which on one hand requires the application of high pressures during dialysis, which increases energy as well as equipment requirements while performing of the method, and on the other hand leads to a much higher energy requirement for dialysis, which increases proportionally with the pH difference between the solutions on the concentrate and the diluate sides, which is also described in US 2010/059377 A1. Therefore, the method therein is suitable for separating $CO_2$ from gas mixtures containing high concentrations of $CO_2$, e.g., 10-25% by volume or more in combustion exhaust gases, but not for recovering $CO_2$ from ambient air, which usually has a $CO_2$ content of only approximately 400 ppm.

The present inventors have recently described in their European application EP 19153598 A, which was not yet published at the relevant time, and the international application PCT/EP2020/051747 resulting therefrom, a new method for separating and recovering carbon dioxide from ambient air, by means of which the above disadvantages can be largely overcome. According to this method, after absorption of $CO_2$ from air into a basic solution of alkaline metal or alkaline earth metal cations, electrodialysis of the $CO_2$-containing solution is carried out using a combination of a) bipolar and b) ion exchange membranes which are selective for monovalent or multivalent anions, whereupon the resulting solution enriched in (hydrogen-) carbonate ions is subjected to thermal desorption of $CO_2$ by means of steam stripping and subsequent separation of $CO_2$ from the resulting $CO_2$/steam mixture by means of cooling for condensing the steam, the two solutions obtained after dialysis or after steam stripping are recycled, if necessary after adjusting their pH value. After optionally further drying the $CO_2$, it can even be extracted from ambient air in high purity and relatively energy-efficiently.

In addition to the use of a specific combination of bipolar and anion-selective ion exchange membranes for dialysis, the main difference between this method and the previously known state of the art is that the solution obtained is also alkaline. Compared to US 2010/059377 A1, this significantly reduces the energy required for dialysis and eliminates the need to maintain a strongly acidic solution containing $CO_2$ under constant pressure before allowing the $CO_2$ to escape by venting, which significantly reduces the equipment and also the energy required.

However, this method of the inventors of the present subject matter application also requires a certain degree of optimization. The object of the present invention was thus to provide an improved method for extracting $CO_2$ from air with at least the same high purity, but with even less energy input than before.

SUMMARY OF THE INVENTION

In a first aspect, the present invention achieves this object by providing a method for separating and recovering carbon dioxide from ambient air, comprising continuously performing the following steps:

a) bringing ambient air into contact with a basic aqueous solution of at least one alkaline metal or alkaline earth metal cation to absorb the carbon dioxide into the solution to form the hydrogencarbonate or carbonate of the at least one metal;

b) electrodialysis of the resulting solution using a combination of bipolar and anion-selective ion exchange membranes to obtain one solution enriched in (hydrogen-) carbonate ions and one solution depleted thereof, each having a pH >7, the solution depleted in (hydrogen-) carbonate ions being recycled to step a);

c) separating carbon dioxide from the solution enriched in (hydrogen-) carbonate ions to obtain a $CO_2$-depleted solution which is recycled to step b); and (d) optionally drying and purifying the separated carbon dioxide;

the method according to the invention being characterized in that:

A) the absorption in step a) is performed:

Ai) in at least one absorber; or

Aii) in at least one open basin; or

Aiii) in a combination of at least one absorber and at least one open basin; and/or B) separating the carbon dioxide from the solution enriched in (hydrogen-) carbonate ions in step c) is performed Bi) by thermal desorption of the carbon dioxide by steam stripping to obtain a carbon dioxide/steam mixture; and/or Bii) by chemical reaction of the (hydrogen-) carbonate ions, in which the $CO_2$ contained is converted into a water-insoluble salt or gas and thereby removed from solution; and/or C) the pH of either solution obtained in step b) by means of electrodialysis is measured prior to recycling to step a) or prior to separating carbon dioxide in step c), respectively, and is in each case adjusted to a predetermined value;

with the proviso that, if the absorption is not carried out according to Aiii) in a combination of at least one absorber and at least one basin, but the separation of carbon dioxide is carried out according to Bi) by thermal desorption of the carbon dioxide by means of steam stripping, the pH is measured and adjusted according to C).

This new method of the inventors allows for $CO_2$ to be extracted from air in even higher purity and more energy-efficiently than in their previous method. The $CO_2$ can be absorbed from ambient air in a known manner in one or more absorbers (feature Ai)) or in one or more open basins (feature Aii)), which are, however, preferably not natural or artificial standing waters, but rather purposefully constructed, e.g., walled, and particularly preferably relatively shallow basins, or as a new feature Aiii) in a combination thereof, which will be discussed in more detail later. The separation of carbon dioxide can also be carried out either in a known manner by thermal desorption of carbon dioxide by means of steam stripping (feature Bi)), or as a new feature Bii) by chemical reaction of the (hydrogen-) carbonate ions, in which $CO_2$ is converted into a water-insoluble salt or a gas and in this form can be easily removed from the solution, which will also be discussed in more detail later.

And as a third feature of the present invention, the new method of the inventors now comprises pH measurement and adjustment of the two solutions obtained by electrodialysis in step b) before they are passed to step c) or recycled to step a), preferably immediately after electrodialysis. The result of the pH measurement can be used to determine the ratio between hydrogencarbonate and carbonate ions (see e.g., FIG. 1) and also to determine how much $CO_2$ was absorbed per time. This allows for precise pH control and setting of other parameters and concentrations of the solutions that are desirable for the most efficient method possible. For example, when using chemical reactions to remove the $CO_2$ in step c) according to feature Bii), the required amount of reactants can be determined in this way before the solution enriched with (hydrogen-) carbonate ions by electrodialysis is introduced into the reactor.

The pH can be determined in any known way, e.g., colorimetrically, potentiometrically or with ion-sensitive field-effect transistors. However, it is obvious to those skilled in the art that the ionic equilibrium can also be determined by other equivalent methods, e.g., chromatographic or the like, without departing from the spirit of the present invention. In the case that in the simplest embodiment of the present invention known steps are carried out for the absorption and for the separation of $CO_2$, the method according to the invention of course necessarily comprises that the pH determination and control according to feature C) are carried out at the indicated position in the method, as this is also shown in FIG. 1.

As before, in the new method according to the present invention, the electrodialysis of (hydrogen-) carbonate ions is carried out from a first into a second alkaline solution, i.e. between solutions with a low pH difference, which reduces the energy requirement of the dialysis step. The pH of the solution is preferably set to at least 7.5, but in particularly preferred embodiments it can also be set to at least 8.0, so that the absorbed $CO_2$ is not converted into relatively unstable carbonic acid, but rather completely in the form of hydrogencarbonate or carbohydrate ions, to at least 10.0 or even to at least 11.0, the latter causing that the carbon dioxide absorbed therein to be present essentially in the form of $CO_3^{2-}$ ions. FIG. 1 shows a graphical representation of the pH-dependent equilibrium between the three species. The pH values to be preferred in each case will be discussed in more detail later.

In general, due to the better solubility of the hydroxides and carbonates, a solution of alkaline metal ions is preferred to one of alkaline earth metal ions for absorption, and even more preferably a basic solution of $Na^+$ or $K^+$ ions, and for cost reasons in particular of $Na^+$ ions. Such electrolyte systems are stable, i.e., there is no exchange or loss of electrolyte ions with or to the atmosphere. Although the sorption capacity of the absorption solution or the sorption rate can be increased by using additional chemicals, such as methanol or formaldehyde, this is not necessary for the operation of the disclosed system and is therefore not preferred for reasons of cost and environmental protection.

In preferred embodiments of the present invention, the absorption in step a) is carried out according to feature Aiii) in a combination of at least one absorber and at least one open basin, because this allows the advantages of both variants to be used according to the respective limiting conditions. An absorber allows for the absorption of large quantities of $CO_2$ in a relatively short time, but requires energy for operation, while absorption in a basin can take place almost without energy input, but requires a relatively long time to absorb larger quantities. The sequence in which the absorption solution passes through the various types of absorption stations is not specifically limited according to the present invention, i.e., it can first pass through one or more, preferably large-surface area basins with a low liquid level, i.e., shallow basins, in which it can dissolve and absorb $CO_2$ for a long time, after which it is pumped through one or more absorbers to further increase the amount of carbon dioxide absorbed. Alternatively, it may pass through several different stations in turn, but this is not preferred.

In preferred embodiments of the invention, the absorption is first carried out first in at least one absorber and then in at least one open basin, since the solution of at least one alkaline metal or alkaline earth metal cation recycled from the electrodialysis generally has an increased temperature. This causes a "chimney effect" within the closed absorber, which is preferably a spray scrubber or spray tower or a packed column, i.e., the air in the absorber heats up on contact with the warm or hot solution, which results in buoyancy, whereby the air is automatically set in an upward motion or at least supported in such a motion. In the at least one open basin provided thereafter, the solution, already partially enriched in (hydrogen-) carbonate ions and cooled during treatment in at least one absorber, can subsequently also more easily absorb further $CO_2$, since a higher temperature would impede absorption.

If the absorption solution according to the present invention passes through more than one open basin, these basins are preferably arranged at different heights and are passed through in the order from the highest to the lowest, so that the transfer can be implemented by gravity and no pumps have to be used.

In even more preferred embodiments of the method according to the invention, the absorption in step a) is carried out in at least one absorber, the bottom of which has a sump or collection tank in which the solution enriched by absorption with (hydrogen-) carbonate ions is temporarily stored before it is passed on to the next absorber or to an open basin or to electrodialysis. The possibility of such intermediate storage provides an additional time window in the method according to the invention if it cannot be operated with constant volume flows due to certain circumstances, e.g., power shortages or unfavorable weather conditions. In this way, $CO_2$ absorption can be continuous, without interruptions, maximizing $CO_2$ yield, while electrodialysis can be activated and deactivated intermittently, depending on the availability of low-cost electrical power, enabling the complete process to operate at the lowest possible cost. Furthermore, in some embodiments, the solution already partially enriched with (hydrogen-) carbonate ions may cool further in such an intermediate storage tank for the above reasons before being transferred to an open basin. In any case, however, further absorption of $CO_2$ from the gas space takes place during such an intermediate storage, which is why such a sump or collection tank can be regarded herein as an additional absorber, as will be explained in more detail in the following examples.

As already mentioned, packed columns, spray scrubbers or spray towers, particularly preferably a spray scrubber or spray tower, are preferably used for absorption in accordance with the present invention, since the latter in particular can be operated in a very energy-efficient manner. In general, however, any devices for promoting the absorption of the $CO_2$ gas into the alkaline solution can be used to shorten the time required for the absorption of a certain amount of $CO_2$ gas and to increase the yield per unit of time of the method according to the invention, e.g., jet, immersion, vortex, rotary or turbine scrubbers.

Irrespective of whether the absorption in step a) is also carried out in at least one absorber and in which order it is carried out, if both at least one absorber and at least one open basin are used, it is preferably carried out, if at least one open basin is also used, in at least one open basin, above which at least one cover is arranged at a distance suitable for limiting the vaporization of water from the aqueous absorption solution. Since open basins are usually provided outdoors, a not inconsiderable amount of water can otherwise be lost, e.g., due to heating of the solution by solar radiation or due to wind, as a result of which the pH can shift into an undesirable range or saturation of the solution with $CO_2$ is reached earlier. This is counteracted by providing a cover, e.g., at a distance of 1 to 150 cm, preferably not more than 100 cm, more preferably not more than 50 cm, in particular not more than 25 cm, above the edge of the basin. Preferably, the cover covers at least a large part of the surface area of the basin or essentially the same or even a larger surface area in order to increase the effect.

In order to make further good use of this area, the cover preferably comprises a photovoltaic system, whereby at least part of the electrical energy for carrying out the method can be produced from sunlight, which further increases energy efficiency of the method according to the invention.

Furthermore, in preferred embodiments, the at least one open basin has integrated partition walls, between or around which the basic aqueous solution of the at least one alkaline metal cation or alkaline earth metal cation is guided in a meandering manner for absorption of carbon dioxide, thus increasing its residence time in the tank, additionally, better mixing of the solution is ensured during contact with ambient air and, above all, back-mixing with the continuously flowing downstream waste solution, which is still somewhat poorer in $CO_2$, is suppressed.

The electrodialysis in step b) of the method according to the invention is carried out in an electrodialysis separator in which a combination of bipolar ion exchange membranes and ion exchange membranes selective for monovalent or polyvalent anions are used for the electrodialysis, since these membranes are capable of carrying out the electrodialysis of (hydrogen-) carbonate ions in a very efficient manner. In general, it should be noted that the term "(hydrogen-) carbonate ions" is used herein to mean "hydrogencarbonate and/or carbonate ions". This means, for example, regarding the dialysis step that, depending on the desired method, either mainly or essentially only monovalent hydrogencarbonate ions or mainly or essentially only divalent carbonate ions or both are enriched simultaneously on the concentrate side of the electrodialysis separator. Which variant is selected depends, among other things, on the concentration of the solution of the at least one alkaline metal ion and on its pH value. In relatively highly diluted solutions, i.e., solutions with a pH of between 7 or 7.5 and 8.5, the absorbed $CO_2$ is mainly present as hydrogencarbonate, as is also shown in FIG. 1.

The absorption, i.e., the phase transition of $CO_2$ from the gaseous phase into the liquid phase, can also be accelerated by setting even higher pH values, since the presence of large amounts of base will shift the equilibrium of the respective chemical reactions towards the product side:

$$NaOH + CO_2 \rightarrow NaHCO_3$$

$$2NaOH + CO_2 \rightarrow Na_2CO_3 + H_2O$$

This will be described in more detail later. In some preferred embodiments, the separation of carbon dioxide in step c) is performed according to feature Bi) in a known manner by thermal desorption, optionally supported by a vacuum, by means of steam stripping, wherein the carbon dioxide is particularly preferably recovered by means of simple cooling for condensing steam from the carbon dioxide/steam mixture obtained in this method and, if desired, by means of subsequent further drying. To achieve this, however, a vaporizer for producing steam is required, which of course results in a considerably higher energy input requirement for this method.

However, the method according to the invention can be carried out more economically using steam stripping by:
i) using waste heat of a power plant or factory to generate the steam in step c) and/or to heat the solution enriched in (hydrogen-) carbonate ions obtained in step b) prior to steam stripping in step c); and/or ii) using direct current from renewable energy sources for electrodialysis in step b).

The location of the facility for carrying out the method according to the invention thus also plays a significant role.

In particularly preferred embodiments, however, the separation of carbon dioxide in step c) is carried out—in addition or as an alternative to steam stripping according to B1)—by chemical reaction of the (hydrogen-) carbonate ions according to feature Bii).

This reduces energy requirements, even if steam stripping is also carried out, and enormously reduces both the energy requirement and the equipment expenditure if chemical reactions are used exclusively.

If both methods are used, steam stripping is preferably carried out first in order to separate a large part of the absorbed $CO_2$, after which the remainder can be removed from the solution by chemical reactions. According to the present invention, however, embodiments in which the separation is carried out exclusively according to Bii) by chemical reactions are particularly preferred for the above reasons.

Which chemical reactions are carried out is not specifically limited according to the present invention, as long as the reaction product of the (hydrogen-) carbonate ions with one or more reactants to be mixed in the reactor with the absorbed $CO_2$-enriched solution from the electrodialysis is either a poorly soluble precipitate or a gas, each of which can be easily removed from the reaction mixture.

In preferred embodiments of the invention, a solution of at least one alkaline metal cation is used for absorption, in which a pH value of at least 11 is particularly preferably set so that the carbon dioxide absorbed therein is essentially in the form of $CO_3^{2-}$ ions. One or more alkaline earth metal ions, preferably $Ca^{2+}$ or $Mg^{2+}$, are then added to the reactor to form $MgCO_3$ or $CaCO_3$ due to their easy availability and de facto insolubility in water, which precipitates directly as a precipitate from the solution and can be separated in a particularly simple manner, preferably by sedimentation or filtration, from the solution to be recycled for electrodialysis, which has now been stripped of carbonate.

In other preferred embodiments, electrochemical reductions to gaseous hydrocarbons $C_xH_y$ are carried out as a chemical reaction of the (hydrogen-) carbonate ions in accordance with the following general reaction equations:

$$XHCO_3^- + (5X+Y)H^+ + (4X+Y)e^- \rightarrow C_XH_Y\uparrow + 3XH_2O$$

$$XCO_3^{2-} + (6X+Y)H^+ + (4X+Y)e^- \rightarrow C_XH_Y\uparrow + 3XH_2O$$

The hydrocarbons formed in this way escape directly from the solution, but according to the present invention this can preferably be assisted by applying a vacuum in the reactor, whereby the gas is extracted from the reactor chamber. Additionally or alternatively, however, the outgassing can be supported by ultrasonication.

Due to the lowest energy requirement for the reduction and its usability as a fuel, methane is preferably formed from carbonate ions as a gaseous reaction product according to the following equation:

$$CO_3^{2-} + 10H^+ + 8e^- CH_4\uparrow + 3H_2O$$

If required, higher hydrocarbons such as ethylene can also be produced according to the equation below:

$$2CO_3^{2-} + 16H^+ + 12e^- \rightarrow + C_2H_4\uparrow + 6H_2O$$

Hydrocarbon mixtures such as a mixture of methane and ethylene can also be formed by the electrochemical reductions according to the present invention according to the equation below:

$$3CO_3^{2-} + 26H^+ + 20e^- \rightarrow CH_4 + C_2H_4\uparrow + 9H_2O$$

In other preferred embodiments of the method according to the invention, the solutions which are depleted of (hydrogen-) carbonate ions and subsequently recycled in the corresponding process step are each subjected to a heat exchange, e.g., with a solution enriched therewith, in order to further improve the energy balance of the method.

For example, when steam stripping is carried out to separate carbon dioxide according to feature Bi), the relatively cold solution enriched in (hydrogen-) carbonate ions obtained in step b) can be subjected to a heat exchange prior to steam stripping i) with the relatively hot solution already subjected to steam stripping, prior to its recycling to step b), in order to heat the former solution and cool the latter solution; and/or ii) subjected to the carbon dioxide/steam mixture obtained during steam stripping to heat them and cool the carbon dioxide/steam mixture to condense the steam.

Also, the condensate obtained when cooling the carbon dioxide/steam mixture can be recycled to step b) and/or recycled to step c) and again generate steam therefrom for steam stripping.

If chemical reactions are used exclusively to separate $CO_2$, on the other hand, a higher temperature of the reaction solution is desirable, since this causes higher reaction rates and, in the case of electrochemical reduction, promotes the outgassing of the gas or gases formed in the process from the reaction mixture.

Those skilled in the art of chemical process engineering are familiar with further measures known from prior art for optimizing the method according to the present invention, so that such measures can be implemented in the method described herein without undue experimentation.

In a second aspect of the present invention, a facility for continuously carrying out the method according to the first aspect is provided, the facility according to the invention comprising the following devices or sections of the facility in fluid communication with each other via respective interconnections:

a) at least one absorber or at least one open basin for bringing ambient air into contact with an aqueous solution of at least one alkaline metal cation or alkaline earth metal cation for the absorption of carbon dioxide, thereby forming the hydrogencarbonate or carbonate of the at least one metal;

b) an electrodialysis separator comprising a combination of bipolar ion exchange membranes and anion-selective ion exchange membranes for carrying out an ion exchange to obtain an ionic solution enriched in (hydrogen-) carbonate ions and a solution depleted therefrom, as well as a unit for recycling the solution depleted in (hydrogen-) carbonate ions to a);

c) means for separating carbon dioxide from the solution enriched with (hydrogen-) carbonate ions, and a line for recycling the solution depleted of (hydrogen-) carbonate ions to a); and d) optionally, means for drying and/or purifying the carbon dioxide separated in c); characterized in that:

A) the facility comprises

Ai) at least one separator; or

Aii) at least one open basin; or

Aiii) a combination of at least one separator and at least one open basin; and/or B) the means for separating carbon dioxide from the solution enriched in (hydrogen-) carbonate ions comprises:

Bi) a desorption column for performing steam stripping of the solution enriched in (hydrogen-) carbonate ions to obtain a carbon dioxide/steam mixture; and/or Bii) a reactor for performing a chemical reaction of the (hydrogen-) carbonate ions by converting $CO_2$ contained therein into a water-insoluble salt or gas, and optionally means for removing the water-insoluble salt or gas from the reactor; and/or C) the facility comprises pH regulators for measuring and adjusting the pH of each of the solutions obtained in the electrodialysis separator prior to the recycling to a) or prior to separation of the carbon dioxide;

with the proviso that, if the facility does not comprise a combination of at least one absorber and at least one open basin according to Aiii), but comprises a desorption column for performing steam stripping, it comprises the pH regulators for measuring and adjusting the pH of the solutions obtained in the electrodialysis separator according to C).

Thus, the same advantages are achievable, as was previously described with respect to the method according to the invention, in particular a further improvement of the energy balance and the purity of the $CO_2$ obtained, while the apparatus expenditure can also be significantly reduced in preferred embodiments.

In some preferred embodiments, the facility according to the invention comprises a combination of at least one absorber and at least one open basin according to feature Aiii), which combines the advantages of both options: While larger amounts of $CO_2$ can be absorbed in a relatively short time in an absorber, the energy requirement for operation is high. In a basin, on the other hand, the absorption can take place with almost no energy input, but it takes considerably more time to achieve it. As already mentioned, the sequence in which the absorption solution passes through the various types of absorption stations is not particularly limited in accordance with the present invention, i.e., one or more, preferably large-area basins with a low liquid level, i.e., shallow basins, can be provided first in the flow direction of the process solution, followed by one or more absorbers or also one or more various alternating stations. However, the latter is not to be preferred.

In a case in which the facility according to the invention comprises more than one open basin, these basins are, as previously mentioned, preferably arranged at different heights so that the absorption solution can pass through them by gravity alone, in the order from the highest to the lowest, and no pumps have to be provided for this purpose.

According to the present invention, it is preferred that at least one absorber, which is preferably a spray scrubber, a spray tower or a packed column, in particular a spray scrubber or spray tower, and then at least one open basin are provided in the facility according to the invention, which brings about the positive temperature effects described above.

Even more preferably, the facility according to the invention comprises at least one sump, the bottom of which comprises a sump or collection tank for the intermediate storage of the solution enriched by absorption with (hydrogen-) carbonate ions, thus creating a temporal buffer, so to speak, in the process.

As already mentioned, the at least one open basin of the facility according to the invention is preferably one above which at least one cover is arranged at a distance suitable for limiting the evaporation of water from the aqueous absorption solution, e.g., at a distance of 1 to 2 mm. e.g., at a distance of 1 to 150 cm, preferably not more than 100 cm, more preferably not more than 50 cm, in particular not more than 25 cm, above the edge of the basin. In this case, the cover has at least a large part of the surface area of the basin or essentially the same or even a surface area larger than the basin in order to further enhance this effect. Furthermore, the cover preferably comprises a photovoltaic system at the top to generate the electrical energy for operation at least partially from sunlight.

In further preferred embodiments of the facility according to the invention, partition walls are provided in the at least one open basin, between which or around which the absorption solution of the at least one alkaline metal or alkaline earth metal catalyst is guided in a meandering manner, which increases its residence time in the basin, improves mixing and, above all, suppresses back-mixing with continuously flowing, even $CO_2$-poorer absorption solution.

In some preferred embodiments, the facility according to feature Bi) comprises a desorption column for performing steam stripping of the solution enriched in (hydrogen-) carbonate ions to obtain a carbon dioxide/steam mixture as well as a condenser for separating water from the carbon dioxide/steam mixture by condensation and, optionally, also a dryer for the carbon dioxide obtained.

In particularly preferred embodiments, however, it comprises, in accordance with feature Bii), a reactor for carrying out a chemical reaction of the (hydrogen-) carbonate ions by converting the contained $CO_2$ to a water-insoluble salt or gas, and furthermore, if appropriate, a filter for removing the water-insoluble salt or a device for siphoning off or sonicating the reaction solution to remove the gas from the reactor.

Depending on which chemical reactions are used to convert the absorbed $CO_2$ in the method according to the invention, the reactor of the facility according to the invention can preferably comprise corresponding storage tanks for the required reactants, e.g., a storage tank for an aqueous solution of alkaline earth metal ions. Or it may comprise electrodes for carrying out electrochemical reduction of the (hydrogen-) carbonate ions. A filter is preferably further provided in the reactor for removing precipitates of poorly soluble salts, e.g., $CaCO_3$, and a vacuum pump for suctioning off the reactor gas space and/or an ultrasonic generator for promoting the outgassing is preferably provided for removing gaseous reaction products.

For example, seawater can be used as a source of metal ions for the start-up phase of the facility according to the invention and to provide larger quantities of (alkaline earth) metal ions, and a chlorine-alkaline electrolysis can be used to prepare the (alkaline earth) metal ion solution. In order to maintain the water volume at a constant level, a reverse osmosis unit can also be used, for example, to remove any excess water (which can sometimes overflow the open absorber tanks) from the liquid circuit.

Different bypass valves can be used to allow intermittent operation of the electrodialysis during continuous operation of the absorber.

Furthermore, the facility according to the invention can, in addition to obvious components such as pipes, valves and pumps, preferably also include one or more of the following components, selected from different pH regulators, (vacuum) pumps, evaporators, heat exchangers, heating and cooling devices, filter and membrane separators, storage tanks for fresh water and (earth) alkaline metal ions, metering pumps and a computer control system, as well as any components and equipment required or desirable for further optimization measures.

BRIEF DESCRIPTION OF THE FIGURES

The present invention will now be described in more detail with reference to preferred embodiments that are, of course, only provided for illustrative purposes and are not meant to limit the invention, a calculation example for the energy consumption of the inventive method and the associated facility, as well as with reference to the enclosed drawings, wherein.

EXAMPLES

As previously mentioned, in preferred embodiments of the invention, a pH of the alkaline solution of the at least one alkaline (earth) metal ion is adjusted in step a) to a value of at least 7.7, at least 8.0, or even higher, e.g., >11.0. However, the preferred pH range will also depend on the fact if one or more open basins or absorber, such as one or more spray scrubbers or spray towers, or combinations thereof are used for absorption.

As has also been mentioned previously, the presence of large quantities of a base will shift the balances of the following chemical reactions to the product sides:

$$NaOH + CO_2 \rightarrow NaHCO_3$$

$$2NaOH + CO_2 \rightarrow Na_2CO_3 + H_2O$$

which is why, according to the present invention, in which brick-built, shallow basins are preferred instead of natural bodies of water as open basins, a pH of the absorption solution of at least 10.0, especially of at least 11.0, is set. Further it is preferred to use a solution of alkaline metal ions because, on the one hand, alkaline earth metal ions could damage the electrodialysis membranes and, on the other hand, a precipitation of poorly soluble alkaline earth metal carbonates, thus separating the $CO_2$ absorbed, can be performed in this way by adding alkaline earth metal ions.

Figure 2:
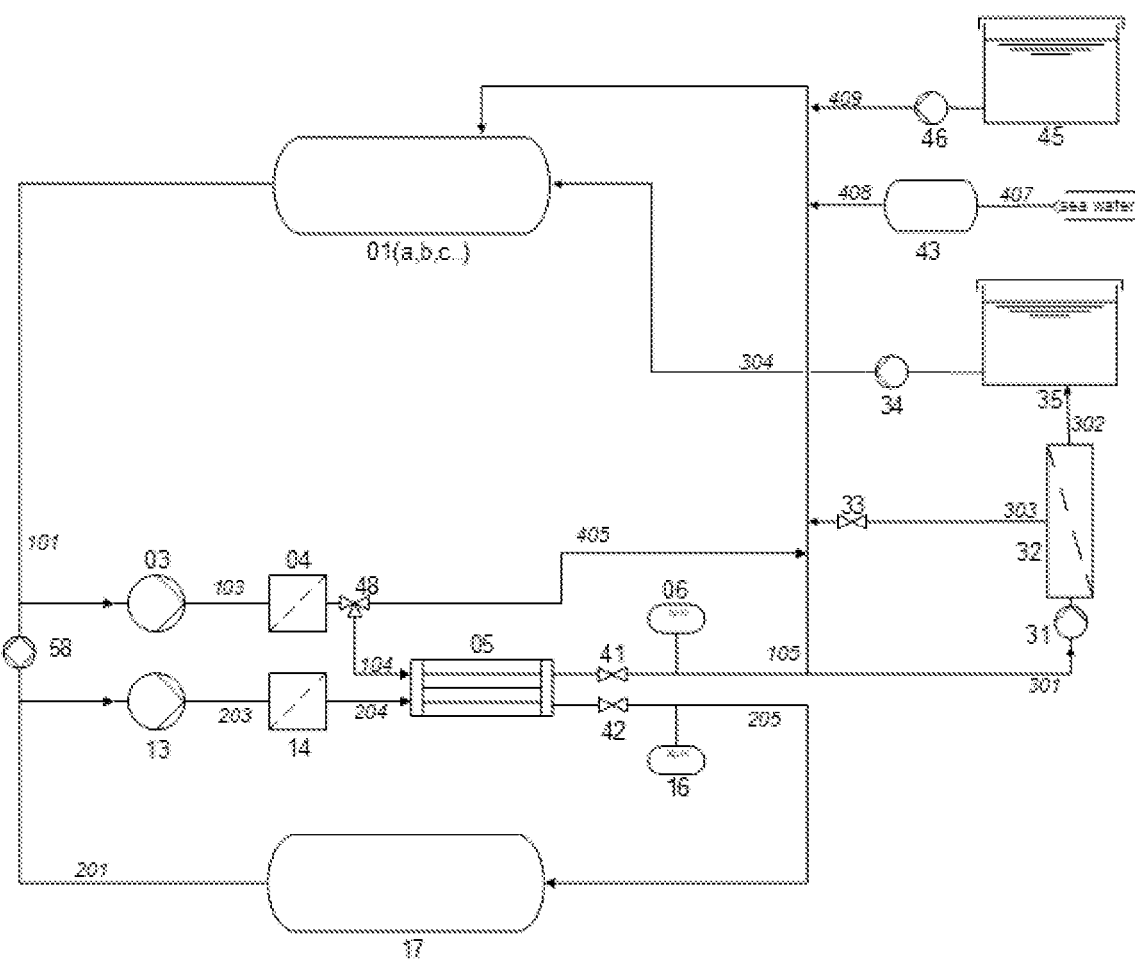
FIG. 2 is a flow diagram of an embodiment of the inventive method or the inventive facility, respectively.

A simple embodiment of the facility for carrying out the method according to the invention can be designed as shown schematically in FIG. 2. The reference signs contained therein—and in FIG. 3—have the following meanings, the three-digit reference signs for lines simultaneously indicating the fluid flows transported therein.

KEY TO FIG. 2 AND FIG. 3

01a Absorber: packed column or spray scrubber
01b Absorber: sump or buffer tank

01c Absorber: open basin
03 Circulating pump of the 1st liquid circuit
04 Filtration and/or conditioning in the 1st liquid circuit
05 Electrodialyzer
06 pH value determination and adjustment in the 1st liquid circuit
07 Feed pump between absorbers
08 Circulation pump for refrigeration drying
09 Condenser and cooling dryer
13 Circulation pump of the 2nd liquid circuit
14 Filtration and/or conditioning in the 2nd liquid circuit
16 pH value determination and adjustment in the 2nd liquid circuit
17 $CO_2$ separation: desorption column and/or reactor
31 Pump for water level control
32 Reverse osmosis
33 Control valve for water level control
34 Pump for water level control
35 Water tank
37 Water level measurement
41 Control valve or pressure maintaining valve in the 1st circuit
42 Control valve or pressure maintaining valve in the 2nd circuit
43 Water conditioning/metal ion treatment
44 Water and/or metal ion source
45 Container with metal ion solution
46 Dosing pump for the metal ion solution
48 Electrodialysis bypass valve
58 Bidirectional pump for metal ion balancing
101 Diluate after $CO_2$ absorption
103 Diluate after pressure increase
104 Diluate after conditioning (diluate inlet to electrodialysis)
105 Diluate recirculated for absorption (diluate outlet from electrodialysis)
107 Connection between the absorbers
108 Supply of cold water to the cooling-drying unit
109 Recirculation from cooling drying
405 Bypass of the electrodialysis
201 Concentrate recycling after $CO_2$ separation
203 Concentrate after pressure increase
204 Concentrate after conditioning (concentrate inlet to electrodialysis)
205 Concentrate from electrodialysis for $CO_2$ separation
301 Inlet into the reverse osmosis system
302 Inlet of water into the water storage tank
303 Recycling of the absorbent solution from reverse osmosis
304 Water supply line to absorbers
407 Feed line from metal ion or water source to water treatment plant
408 Fresh water or metal ion supply line
409 Feed line for metal ion solution The method according to the invention and the inventive facility start with at least one absorber 01 for absorbing $CO_2$ from ambient air, as shown in the center of the above FIG. 2, which preferably consist of at least one spray scrubber or spray tower 01a, especially preferably each including a sump or buffer tank 01b, or at least one open basin 01c, or particularly a combination thereof.

As is particularly preferred and due to the abovementioned reasons, the cations are alkaline metal cations, more preferably $Na^+$ or $K^+$ ions or a mixture thereof. Furthermore, the solution within the absorbers may contain additives for increasing the sorption capacity of the absorbing solution or of the absorbing rate, e.g., lower alcohols or formaldehyde, however, these are not required for the efficacy of the invention and are not preferred due to environmental concerns and reasons of cost efficiency.

Through the absorption of $CO_2$ from ambient air, dependent on the solution pH, a formation of hydrogencarbonate and/or carbonate anions will take place in the alkaline solution. Preferably, a high pH will be set for supporting absorption, e.g., a pH of >10 or >11.

The alkaline solution of the absorbed $CO_2$ is subsequently subjected to a dialysis step and for this purpose fed to an electrodialysis separator 05. This can be done either directly or, as shown in FIG. 2, preferably after a preceding filtration or conditioning of the solution, e.g., by heating, in order to accelerate the mass transfer during the dialysis process, for which the heat of a liquid stream occurring later in the process but recycled to a previous stage can also be used by means of a heat exchange, which would otherwise be lost as waste heat, e.g., the heat of a steam stripping process. For example, the heat of a solution subjected to steam stripping from the second liquid circuit or that of the solution depleted of (hydrogen-) carbonate ions by electrodialysis before it is recycled to the absorption step. The optional filtration allows for impurities to be largely removed from the solution prior to dialysis, and conditioning is understood to mean not only heating but also the optional addition of pH regulators and/or other additives to promote the absorption and desorption processes. In preferred embodiments, filtration and conditioning are carried out essentially simultaneously in a filter/conditioner 04, to which the alkaline solution of absorbed $CO_2$ in FIG. 2 is fed via line 101, pump 03 and line 103.

Figure 4:
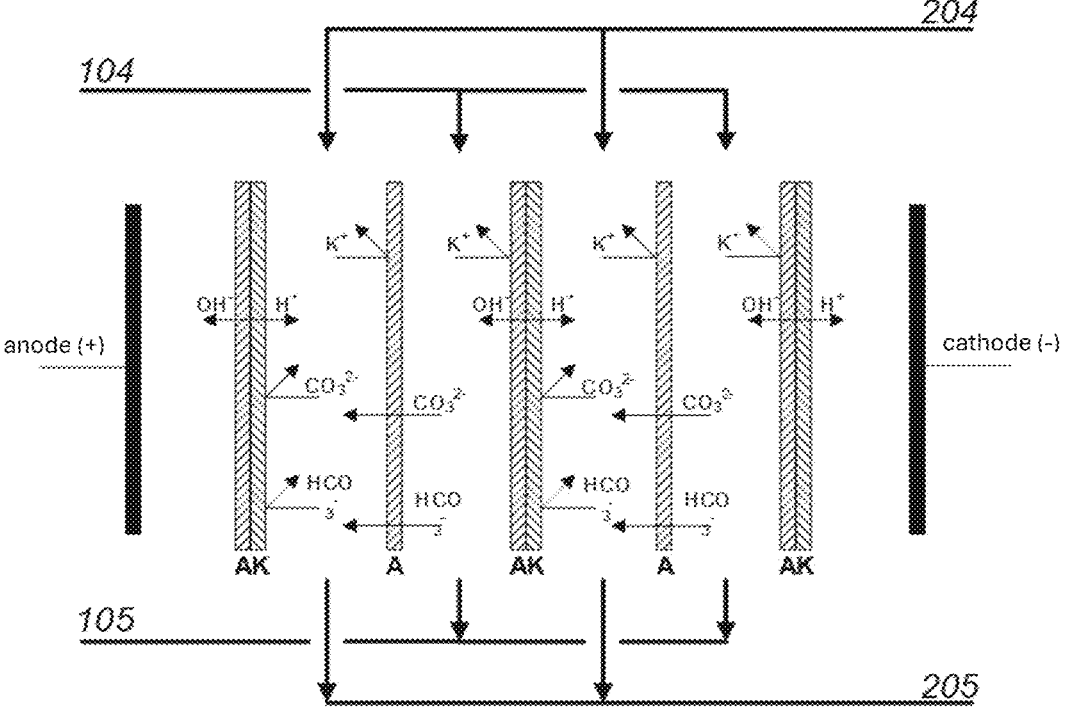
FIG. 4 is a schematic representation of a preferred arrangement of anion-selective ("A") and bipolar ("AK") membranes in an electrodialysis separator in step b) of the method.

From there, the solution, which may have been heated and/or filtered/conditioned, passes via line 104 into the electrodialysis separator 05, where a solution is obtained which is depleted in (hydrogen-) carbonate ions, and a solution which is enriched in these ions. With the preferred choice of a pH value of the alkaline solution in the desorption step being >10 or >11, a combination of anion-selective ion exchange membranes "A" and bipolar membranes "AK" is used in the electrodialysis separator 05 to carry out the dialysis as shown in FIG. 4. Via the three-way valve still provided upstream of the electrodialysis separator 05, the electrodialysis bypass valve 48, the solution enriched by absorption of $CO_2$ can, if necessary, e.g., from time to time, also be led past the electrodialyzer 05 and, after prior readjustment of the water quantity and/or the concentration of the alkaline (earth) metal ions via water tank 35 and pump 34 or a (sea) water reservoir, line 407 and water conditioner 43 and line 408, or metal ion reservoir 45, pump 46 and line 409 can be recycled in the first or (with regard to electrodialysis) "diluate" circuit, without being subjected to electrodialysis in this cycle.

If, on the other hand, the solution is subjected to electrodialysis during normal operation in electrodialyzer 05, it is recycled via control or pressure holding valve 41, with pH measurement and control taking place immediately after electrodialysis at position 06 in order to maintain the desired pH value constant in the diluate circuit and thus ensure smooth continuous operation. The solution removed by electrodialysis is then recycled via line 105, although it may still be fed to a reverse osmosis unit 32 via line 301 and pump 31 in order to remove any excess water from the liquid circuit. Subsequently, it can also be subjected to the same conditioning and treatment steps as previously described for the bypass, if necessary.

The electrodialysis "concentrate" obtained in the electrodialyzer 05, which passes through the second liquid circuit, is discharged from the dialyzer via control or pressure maintaining valve 42. The concentrate obtained in the electrodialyzer 05, which passes through the second liquid circuit, is recycled from the electrodialyzer 05 via the control valve 42, after which a pH measurement and control of this liquid flow also takes place directly at position 16, whereafter the concentrate is passed via line 205 to the next step, the separation of the $CO_2$ as step c) of the method according to the invention, in the means 17 for separating the carbon dioxide from the solution containing (hydrogen-) carbonate ions.

This separation at position 17 can be carried out either by means of steam stripping in a desorption column, as in the earlier applications of the present inventor, or by means of chemical reactions of the (hydrogen-) carbonate ions, in which the $CO_2$ is removed from the solution as a poorly soluble precipitate or as a gas, or also by means of a combination thereof, e.g., in which steam stripping is carried out first and then the residual $CO_2$ is removed by chemical reaction.

Preferably, for the separation by chemical reactions, as mentioned above, a solution containing essentially only hydrogencarbonate ions, especially preferably one with a pH of about 8.0 or about 9.0, is mixed in a reactor 17 with alkaline earth metal ions, preferably $Ca^{2+}$ cations, to obtain a final $CaCO_3$ precipitate which can be separated from the solution by means of a simple filter. In alternative preferred embodiments, a concentrate solution—even more preferably one with a higher pH, e.g., about pH 10.0 or about pH 11.0, to promote the absorption process—is subjected to electrochemical reduction, yielding a hydrocarbon gas, e.g., methane or ethylene, which escapes from the solution, which may be supported by suction means.

The alkaline solution depleted of $CO_2$ in column and/or reactor 17 is recycled to electrodialyzer 05 via line 201, pump 13, line 203, and filter or conditioner 14 for removal of impurities and, if necessary, for heat exchange, as described previously for 04 in the diluate circuit, as well as line 204.

Figure 3:
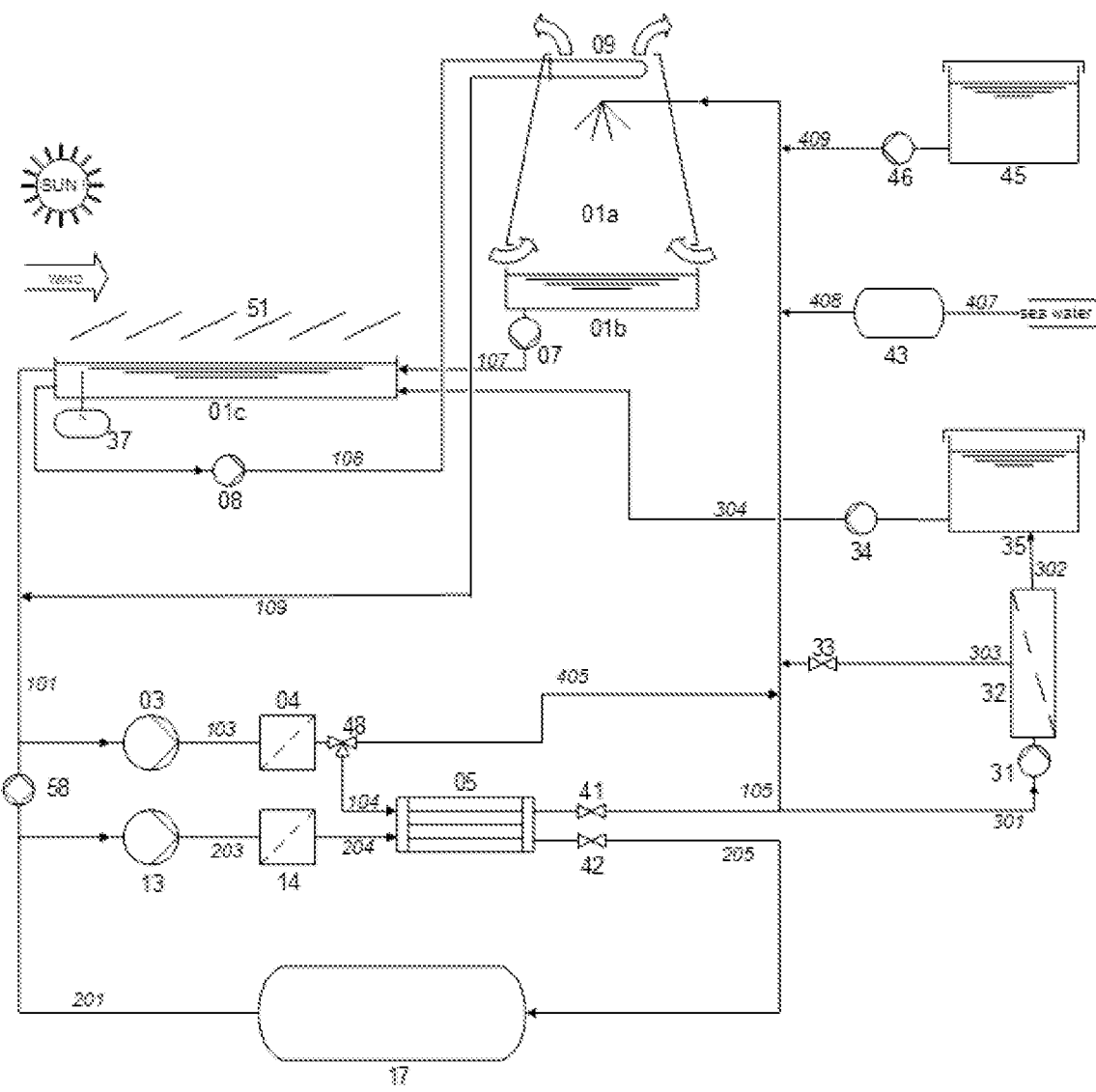
FIG. 3 is a flow diagram of a particularly preferred embodiment of the inventive method or the inventive facility, respectively.

FIG. 3 shows an even more preferred embodiment of the method according to the invention and the associated facility, which comprises essentially the same steps and facility components as those in FIG. 2, but differs in particular in that several different types of absorbers 01 are provided—and that the pH measurement and control do not necessarily have to take place at positions 06 and 16.

The embodiment shown in FIG. 3 comprises an absorber 01*a* shown as a spray tower, the bottom of which encloses a sump or buffer tank 01*b* for intermediate storage of the $CO_2$-enriched absorption solution and as a second absorber, since absorption continues during intermediate storage, as described above. Via pump 07 and line 107, this second absorber is connected to a third element, namely an open basin 01*c*.

This embodiment with positioning of a gas scrubber 01*a* immediately after electrodialysis in the diluate circuit (or after optional prior readjustment of the water quantity and/or the metal ion concentration as previously described) provides the advantage that the solution depleted in (hydrogen-) carbonate ions heated during electrodialysis causes a "stack effect" in the column or the spray tower. In this process, the air in the absorber will heat up through contact with the warm or hot recycled solution and causes buoyancy, which sets the air in an upward motion or at least supports such a motion, which promotes the transfer of $CO_2$ from the air into the absorbing solution. In the sump tank 01*b* provided thereafter and in the open basin 01*c* following it, the solution, already partially enriched in (hydrogen-) carbonate ions and cooled during the passage of the absorber 01a, can then also more easily absorb further $CO_2$, since higher temperatures impede gas absorption.

Figure 5:
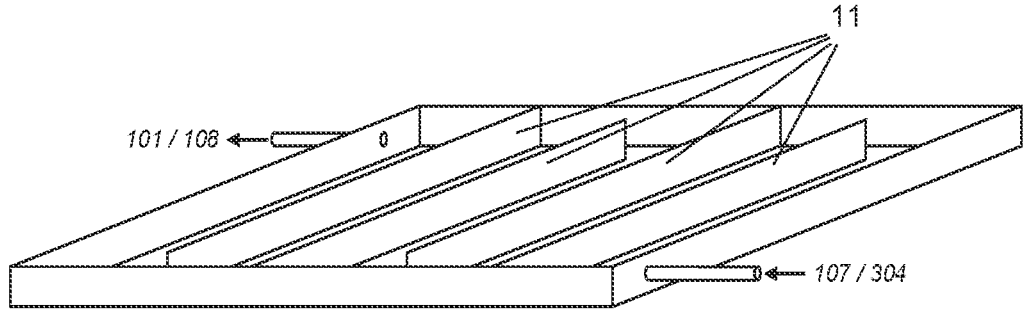
FIG. 5 is a schematic representation of a preferred embodiment of an open basin being a part of the inventive facility for adsorbing $CO_2$ in step a) of the method.

In particularly preferred embodiments of the invention, the at least one open basin 01c is as shown in FIG. 5, i.e., including integrated partition walls 11, between which or around which the basic aqueous absorption solution for absorption of the carbon dioxide is meandered, which increases its residence time in the basin, ensures better mixing of the solution during contact with the air and, above all, suppresses back-mixing with the absorption solution, which is still somewhat poorer in $CO_2$ and continuously flows in via line 107 (and possibly also 304).

At position 37, a level meter is provided to determine the water level of the absorption solution in the open basin 01c in order to be able to re-adjust the water quantity, if necessary, as described above, i.e., to reduce it by means of reverse osmosis at 32 or to increase it by means of water supply via lines 304 and/or 408. Furthermore, a cover 51 is provided above the basin 01c to prevent excessive evaporation of water from the solution during its residence time in the basin. Particularly preferably, this cover 51 comprises a photovoltaic system in order to be able to generate at least part of the electricity required for the operation of the facility from sunlight.

In addition, in the embodiment shown in FIG. 3, a condenser 09 is also provided at the head of the spray tower 01a, which is fed via pump 08 and line 108 with cooled absorption solution enriched with $CO_2$ from the basin 01c and is intended to cause condensation of any moist air (as indicated by arrows) escaping from the spray tower 01a in order to reduce water losses. At the same time, the portion of enriched absorption solution used for this purpose, which is returned to the diluate circuit via line 109, is preheated before being introduced into electrodialyzer 05, which favors electrodialysis.

In all other respects, the embodiment shown in FIG. 3 corresponds essentially to that in FIG. 2, i.e., a desorption column, a reactor or even a combination thereof can be used to separate the $CO_2$ from the absorption solution at position 17.

With these process steps, using circulation of the water in two circuits on the diluate and the concentrate side, respectively, of the electrodialysis separator and pH measurement and control immediately after electrodialysis and/or using various absorbers and/or separation of the $CO_2$ by means of chemical reactions instead of steam stripping, in particular in the respective particularly preferred embodiments, the method of the present invention can be carried out even more efficiently than the inventors' earlier method, as the following model example demonstrates. However, it is understood that the method described in detail above, as well as the associated facility of the present invention, can also be put into practice with numerous modifications, provided that they lie within the scope defined by the appended claims.

For example, depending on the technical design, the electrodialysis separator 05 can be equipped with various conventional ancillary units, such as internal recirculation pumps for intensifying ion transport, and/or antifouling systems (e.g., by alternating the electrical polarity). Furthermore, since membrane defects in the separator can lead to the accumulation of metal ions in one of the circuits during prolonged operation of the facility, electrodialysis can be carried out using additional pumps for periodic or continuous balancing of the metal ions in the diluate or concentrate.

Nevertheless, all embodiments of the method and facility according to the invention comprise two separate liquid circuits.

Model Example

Figure 1:
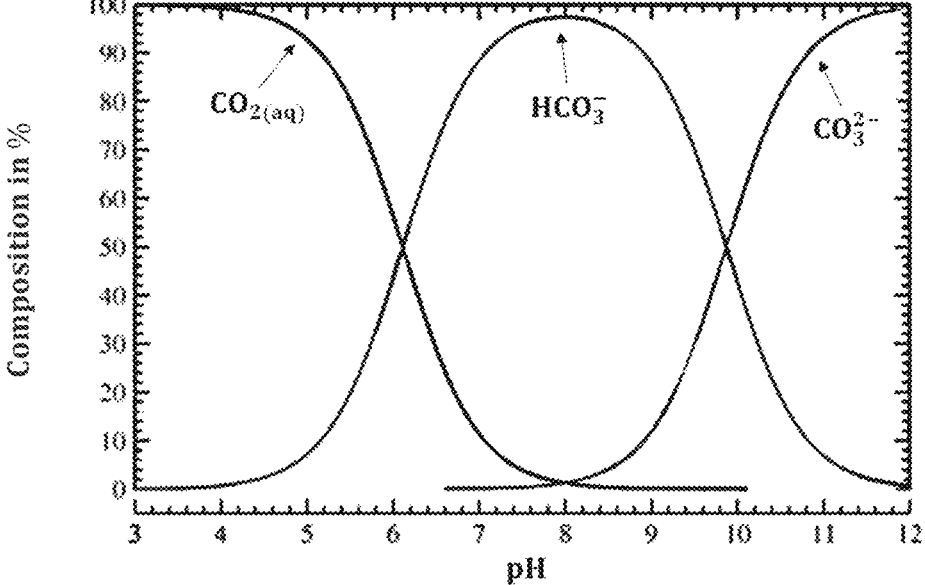
FIG. 1 is a graph showing the pH-dependent equilibrium between carbonic acid, hydrogencarbonate, and carbonate in aqueous solutions.

In this example, a model for the inventive method and the inventive facility as shown in FIG. 3 was calculated with computer assistance, including pH measurement and control at positions 06 and 16 of FIG. 2 and using chemical reactions for separating $CO_2$ in reactor 17, based on empirical data, in order to estimate energy consumption. This model is based on the following parameters and assumptions:

Spray tower 01a is supplied with 1000 m³/h of a 20% potassium carbonate/bicarbonate solution via line 105. The temperature at the spray head inlet is ~55° C. and the pH is >11.7. As can be seen from FIG. 1, the solution thus comprises almost exclusively carbonate anions (~1.7 mol/l) and only traces of hydrogencarbonate ions (~0 mol/l).

Due to the stack effect mentioned above of the hot solution, the spray tower will automatically suck in cold ambient air (~15° C.), whereby a cooling of the solution to −30° C. and a slight decrease of the solution pH to pH ~11.3 resulting from the absorption of $CO_2$ are effected. The solution which is thereby slightly cooled and partially enriched with $CO_2$ will be collected in the sump container 01b, where further absorption takes place, and will subsequently be pumped into the shallow open basin 01c by means of pump 07 and line 107, which is embodied as shown in FIG. 5 and with slight downwards inclination to the left side so that it is traversed exclusively due to a gravitational effect, where further cooling of the solution to −15° C. and due to further $CO_2$ absorption further decrease of the pH to pH >~11 are effected, until the balance between atmospheric $CO_2$ and hydrogencarbonate ions within the solution is more or less achieved.

Above the shallow basin 01c a cover 51 with photovoltaic panels having a total peak capacity of ~7 MW is provided, which may provide up to 30% of the electricity which is needed for electrodialysis on sunny days.

At the basin 101 outlet, the proportion of hydrogencarbonate ions of the total adsorbed $CO_2$, i.e., carbonate and hydrogencarbonate ions, is ~20 mol %. The solution is then pumped through the electrodialyzer 05. At the diluate outlet 105 of the electrodialysis, a pH measurement and control is performed, as is shown in FIG. 2, the pH within the line 105 being re-adjusted to >11.7.

In the second circuit, i.e., within the concentrate, a pH measurement and control are initially also conducted at 16 after electrodialysis. However, the pH within the concentrate (in line 205) is set to a lower value, in particular to pH ~9.1. This means that the concentrate solution almost exclusively comprises hydrogencarbonate ions, in particular ~3 mol/l or ~94 mol %, and only small amounts of carbonate ions (~6 mol %).

$CO_2$ separation from the concentrate is being performed in reactor 17 by means of chemical reaction with $Ca^{2+}$ ions, e.g., by adding a calcium hydroxide solution according to the following equations:

$$Ca(OH)_2 + KHCO_3 \rightarrow CaCO_3 \downarrow + KOH + H_2O$$

$$Ca(OH)_2 + K_2CO_3 \rightarrow CaCO_3 \downarrow + 2KOH$$

$CaCO_3$ precipitates from the solution, which shifts the equilibrium of the chemical reactions towards the product sides and thus ensures a more or less quantitative conversion of the absorbed $CO_2$ with a relatively short residence time in the reactor. The precipitated product is separated by means of simple sedimentation, i.e., the $CaCO_3$ precipitate is simply allowed to settle, and the depleted solution is pumped out of the reactor and recycled to the electrodialyzer 05. Residual $CaCO_3$ can be removed from the reactor chamber at intermittent intervals. In this way, almost no energy is required to separate the $CO_2$ from the alkaline solution.

Using these assumptions, according to computer calculations, ~5000 $Nm^3/h$ of pure $CO_2$ can be obtained, bound as $CaCO_3$. This is possible due to the triple adsorption (01$a$, 01$b$, 01$c$), the pH control immediately after electrodialysis and the use of chemical reactions instead of steam stripping, i.e., by selecting the combination of the features Aiii), Bii) and C) according to the invention with the additional sump tank 01$b$ and the partial production of the power required for electrodialysis by photovoltaics, only an energy input of ~12.5 MW is necessary.

The total specific energy requirement for the extraction of $CO_2$ from the ambient air by means of the present invention is thus, according to the calculation, only ~2.5 kWh/ $Nm^3CO_2$, which represents a further considerable improvement compared to the inventors' earlier method, in which a consumption of 3.8 kWh of electrical energy and 1.41 kWh of thermal energy per standard cubic meter $CO_2$ had been calculated.

The invention claimed is:

1. A method for separating and recovering carbon dioxide from ambient air, comprising continuously performing the following steps:

a) bringing ambient air into contact with a basic aqueous solution of at least one alkaline metal or alkaline earth metal cation to absorb the carbon dioxide into the solution to form the hydrogencarbonate or carbonate of the at least one metal;

b) electrodialysis of the solution with absorbed carbon dioxide using a combination of bipolar and anion-selective ion exchange membranes to obtain one solution enriched in hydrogencarbonate and/or carbonate ions and one solution depleted thereof, each having a pH>7, the solution depleted in hydrogencarbonate and/ or carbonate ions being recycled to step a);

c) separating carbon dioxide from the solution enriched in hydrogencarbonate and/or carbonate ions to obtain a $CO_2$-depleted solution which is recycled to step b); and (d) optionally drying and purifying the separated carbon dioxide;

wherein:

A) the absorption of step a) is performed

Ai) in at least one absorber (01$a$); or

Aii) in at least one open basin (01$c$); or

Aiii) in a combination of at least one absorber (01$a$) and at least one open basin (01$c$); and/or B) separating the carbon dioxide from the solution enriched in hydrogencarbonate and/or carbonate ions in step c) is performed Bi) by thermal desorption of the carbon dioxide by steam stripping to obtain a carbon dioxide/steam mixture; and/or Bii) by chemical reaction of the hydrogencarbonate and/or carbonate ions, in which the $CO_2$ contained is converted into a water-insoluble salt or gas and thereby removed from solution; and/or C) the pH of either solution obtained in step b) by means of electrodialysis is measured prior to recycling to step a) or prior to separating carbon dioxide in step c), respectively, and is in each case adjusted to a predetermined value;

with the proviso that, if the absorption is not carried out according to Aiii) in a combination of at least one absorber (01$a$) and at least one basin (01$c$), but the separation of carbon dioxide is carried out according to Bi) by thermal desorption of the carbon dioxide by means of steam stripping, the pH is measured and adjusted according to C).

2. The method according to claim 1, wherein the absorption in step a) is performed according to Aiii), first in at least one absorber (01$a$) and then in at least one open basin (01$c$).

3. The method according to claim 1, wherein the absorption in step a) is performed in at least one absorber (01$a$) having a sump or collection tank (01$b$) at its bottom, in which the solution enriched with hydrogencarbonate and/or carbonate ions by absorption is intermittently stored before it is passed on to the next absorber or into an open basin or to electrodialysis.

4. The method according to claim 1, wherein the absorption in step a) is performed in at least one spray scrubber or spray tower or in at least one packed column (01$a$).

5. The method according to claim 1, wherein the absorption in step a) is performed in at least one open basin (01$c$), above which at least one cover (51) is arranged at a distance suitable to limit the vaporization of water from the basic aqueous solution of the at least one alkaline metal or alkaline earth metal cation.

6. The method according to claim 5, wherein the cover (51) comprises a photovoltaic system producing at least a part of the electric energy required for performing the method from sunlight.

7. The method according to claim 1, wherein the absorption in step a) is performed in at least one open basin (01$c$) having integrated partitioning walls (01$d$), between which the basic aqueous solution of the at least one alkaline metal or alkaline earth metal cation is guided for absorption in a meandering manner which increases the residence time thereof within the basin.

8. The method according to claim 1, wherein the separation of carbon dioxide in step c) is performed according to Bi) by thermal desorption of carbon dioxide by means of steam stripping, optionally supported by a vacuum, and that the carbon dioxide from the resulting carbon dioxide/steam mixture is recovered by means of cooling for condensation of steam and optionally by means of subsequent further drying.

9. The method according to claim 1, wherein within the solution of the at least one alkaline metal or alkaline earth metal cation, a pH of at least 7.5, at least 8.0 or at least 10.0 is set.

10. The method according to claim 1, wherein the separation of carbon dioxide in step c) is performed according to Bii) by chemical reaction of the hydrogencarbonate and/or carbonate ions.

11. The method according to claim 10, wherein, in step a), an aqueous solution of at least one alkaline metal cation for absorption of carbon dioxide is used and that as a chemical reaction of the hydrogencarbonate and/or carbonate ions, a reaction of alkaline earth metal cations for forming not readily soluble carbonates is performed forming a removable precipitate.

12. The method according to claim 11, wherein, in the aqueous solution of the at least one alkaline metal cation, a pH of at least 11 is set, having the carbon dioxide absorbed therein substantially in the form of $CO_3^{2-}$ ions.

13. The method according to claim 10, wherein electrochemical reactions into gaseous hydrocarbons $C_xH_y$ escaping from the solution are performed as chemical reaction of the hydrogencarbonate and/or carbonate ions according to the following General Reaction Equation:

$$XHCO_3^- + (5X+Y)H^+ (4X+Y)e^- \rightarrow C_XH_Y\uparrow + 3XH_2O$$

$$XCO_3^{2-} + (6X+Y)H^+ (4X+Y)e^- \rightarrow C_XH_Y\uparrow + 3XH_2O.$$

14. The method according to claim 13, wherein methane is produced as the gaseous hydrocarbon.

15. The method according to claim 13, wherein the gaseous hydrocarbons are suctioned off by creating a negative pressure within the reactor.

16. The method according to claim 8, wherein a relatively cold solution enriched with hydrogencarbonate and/or carbonate ions obtained in step b) is subjected to a heat exchange prior to steam stripping with i) a relatively hot solution already subjected to steam stripping before its recycling into step b), in order to heat said first solution and to cool the second solution; and/or ii) the carbon dioxide/steam mixture obtained during steam stripping, in order to heat it and to cool said carbon dioxide/steam mixture for condensation.

17. The method according to claim 8, wherein i) waste heat of a power plant or factory is used for producing the steam in step c) and/or for heating the solution enriched with hydrogencarbonate and/or carbonate ions obtained in step b) prior to steam stripping in step c); and/or ii) direct current from renewable energy sources is used for electrodialysis in step b).

18. A facility for continuously performing a method of separating and recovering carbon dioxide from ambient air according to claim 1, comprising the following facility devices or sections:

a) at least one absorber (01*a*) or at least one open basin (01*c*) for bringing ambient air into contact with an aqueous solution of at least one alkaline metal or alkaline earth metal cation for absorbing carbon dioxide while forming the hydrogencarbonate or carbonate, respectively, of the at least one metal;

b) an electrodialysis separator (05) comprising a combination of bipolar ion exchange membranes and anion-selective ion exchange membranes (A, AK) for performing an exchange of ions to obtain one solution enriched with hydrogencarbonate and/or carbonate ions and another solution depleted thereof, as well as a line (105) for recycling the solution depleted of hydrogencarbonate and/or carbonate ions to a);

c) means (17) for separating the carbon dioxide from the solution enriched with hydrogencarbonate and/or carbonate ions, as well as a line (201) for recycling the solution thus depleted of hydrogencarbonate and/or carbonate ions to a); and d) optionally, means for drying and/or purifying the carbon dioxide separated at c); wherein A) the facility comprises:

Ai) at least one absorber (01*a*); or

Aii) at least one open basin (01*c*); or

Aiii) a combination of at least one absorber (01*a*) and at least one open basin (01*c*); and/or B) the means (17) for separating the carbon dioxide from the solution enriched with hydrogencarbonate and/or carbonate ions comprise:

Bi) a desorption column (17) for performing steam stripping on the solution enriched with hydrogencarbonate and/or carbonate ions to obtain a carbon dioxide/water mixture; and/or Bii) a reactor (17) for performing a chemical reaction of the hydrogencarbonate and/or carbonate ions by converting the $CO_2$ contained into a water-insoluble salt or to a gas and, optionally, means for removing the water-insoluble salt or gas from the reactor (17); and/or C) the facility comprises pH regulators (06, 16) for measuring and adjusting the pH of either solution obtained in the electrodialysis separator (05) prior to recycling to a) or prior to separating the carbon dioxide, respectively;

with the proviso that, if the facility does not comprise a combination of at least one absorber (01*a*) and at least one open basin (01*c*) according to Aiii), but a desorption column for performing steam stripping, the facility will comprise the pH regulators (06, 16) for measuring and adjusting the pH of the solutions contained in the electrodialysis separator (05) according to C).

19. The facility according to claim 18, wherein it comprises a combination of at least one absorber (01*a*) and at least one open basin (01*c*) according to Aiii).

20. The facility according to claim 18, wherein it comprises at least one absorber (01*a*) having a bottom part comprising a sump or collection tank (01*b*) for intermittently storing the solution enriched with hydrogencarbonate and/or carbonate ions by absorption.

21. The facility according to claim 18, wherein the absorber (01) is a spray scrubber, spray tower or at least one packed column.

22. The facility according to claim 18, wherein it comprises at least one open basin (01*c*), above which at least one cover (51) is arranged within a distance suitable to limit vaporization of water from the basic aqueous solution of the at least one alkaline metal or alkaline earth metal cation.

23. The facility according to claim 22, wherein the cover (51) comprises a photovoltaic system for producing electrical energy from sunlight.

24. The facility according to claim 18, wherein it comprises at least one open basin (01*c*) having partition walls (01*d*) arranged to guide the basic aqueous solution of the at least one alkaline metal or alkaline earth metal cation in a meandering manner.

25. The facility according to claim 18, wherein it comprises a desorption column (17) for performing steam stripping on the solution enriched with hydrogencarbonate and/or carbonate ions to obtain a carbon dioxide/water mixture according to Bi), was well as a condenser for separating water from the carbon dioxide/water mixture by condensation, and that it optionally further comprises a dryer for the obtained carbon dioxide.

26. The facility according to claim 18, wherein it comprises a reactor (17) for performing a chemical reaction of the hydrogencarbonate and/or carbonate ions by converting the $CO_2$ contained into a water-insoluble salt or a gas according to Bii), and that it optionally further comprises a filter for removing the water-insoluble salt or a device for suctioning off or sonication of the reaction solution for removing the gas from the reactor.

27. The facility according to claim 26, wherein the reactor (17) comprises a storage tank for an aqueous solution of alkaline earth metal ions, or electrodes for a chemical reduction of the hydrogencarbonate and/or carbonate ions.

28. The facility according to claim 18, wherein it further comprises one or more of the following components, selected from further pH controllers, (vacuum) pumps, condensers, heat exchangers, heating and cooling devices, filter and membrane separators, storage tanks for fresh water and alkaline (earth) metal ions, metering pumps and a computed controller.

\* \* \* \* \*